(12) United States Patent
Henderson et al.

(10) Patent No.: US 7,445,094 B1
(45) Date of Patent: Nov. 4, 2008

(54) PASSIVE MAGNETO-RHEOLOGICAL VIBRATION ISOLATION APPARATUS

(75) Inventors: Benjamin K. Henderson, Albuquerque, NM (US); Steven F. Griffin, Albuquerque, NM (US); Joel D. Gussy, Chantilly, VA (US); Steven A. Lane, Albuquerque, NM (US); Elizabeth L. C. Jensen, Redondo Beach, CA (US); Richard K. Davies, Rochester Hills, MI (US); Jennifer A. Gruits, Royal Oak, MI (US); Paul W. Alexander, Ann Arbor, MI (US); David M. Stevens, Athens, MI (US); Ryan D. Majkrzak, San Clemente, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 196 days.

(21) Appl. No.: 11/251,008

(22) Filed: Oct. 11, 2005

(51) Int. Cl.
*F16F 15/03* (2006.01)
(52) U.S. Cl. ............... 188/267; 188/267.2; 267/64.28; 267/140.14
(58) Field of Classification Search ........... 188/267, 188/267.1, 267.2, 378, 379, 380; 267/140.14, 267/140.15, 64.28, 136
See application file for complete search history.

(56) References Cited

U.S. PATENT DOCUMENTS

| | | | |
|---|---|---|---|
| 4,351,515 A * | 9/1982 | Yoshida ..................... 267/225 |
| 5,398,785 A * | 3/1995 | Leitmann et al. ......... 188/267.1 |
| 5,582,385 A * | 12/1996 | Boyle et al. ................. 248/550 |
| 5,632,361 A | 5/1997 | Wulff et al. |
| 5,683,615 A | 11/1997 | Munoz |
| 5,803,213 A | 9/1998 | Davis et al. |
| 5,947,240 A | 9/1999 | Davis et al. |
| 6,082,719 A | 7/2000 | Shtarkman et al. |
| 6,135,390 A | 10/2000 | Sciulli et al. |
| 6,196,528 B1 | 3/2001 | Shtarkman et al. |
| 6,196,529 B1 | 3/2001 | Shtarkman et al. |
| 6,327,024 B1 * | 12/2001 | Hayashi et al. ............... 355/53 |
| 6,382,369 B1 * | 5/2002 | Lisenker .................. 188/267.2 |
| 6,390,252 B1 * | 5/2002 | Namuduri et al. ......... 188/267.2 |
| 6,390,253 B1 * | 5/2002 | Oliver ..................... 188/267.2 |
| 6,752,250 B2 * | 6/2004 | Tanner ....................... 188/267 |
| 7,213,690 B2 * | 5/2007 | Tanner ....................... 188/287 |

* cited by examiner

*Primary Examiner*—Robert A Siconolfi
*Assistant Examiner*—Mariano Sy
(74) *Attorney, Agent, or Firm*—James M. Skorich

(57) ABSTRACT

A fixture is isolated from the transmission of vibration emanating from a vibration source by a damper containing magneto-rheological ("MR") fluid and a plunger mechanically coupling the damper and the fixture. The isolation apparatus is mechanically coupled to the vibration source. The viscosity of the MR fluid contained in the damper is controlled by a magnetic field produced by the vibration of an isolation system responsive to the vibration of the vibration source. The resonant frequency of the isolation system is adjusted to approximate that of the fixture.

10 Claims, 4 Drawing Sheets

PASSIVE MAGNETO-RHEOLOGICAL VIBRATION ISOLATION APPARATUS

STATEMENT OF GOVERNMENT INTEREST

The invention described herein may be manufactured and used by or for the Government of the United States for all governmental purposes without the payment of any royalty.

FIELD OF THE INVENTION

The present invention is generally related to the field of vibration isolation. More particularly, the present invention is a passive system that uses magneto-rheological fluid to reduce vibration transmission over a broad frequency spectrum.

BACKGROUND OF THE INVENTION

A problem often faced in the field of engineering is vibration isolation. Many current applications use devices to isolate a sensitive component from a vibrating environment, or to reduce the transmission of vibration from a vibrating component into its surroundings. Currently, there are numerous ways of accomplishing vibration isolation, including passive apparatus, such as spring and damper systems, and active devices, which utilize actuation to achieve isolation and can be adapted to comply with environmental parameters and flight conditions. The drawbacks to active devices are that they require additional power sources, and are typically more complex and less robust than passive mechanisms. For many applications, passive systems are preferred because they are simpler and self-contained. U.S. Pat. No. 6,135,390 issued to Sciulli et al., teaches a passive mechanism for isolating spacecraft using titanium flexures to act as soft springs. U.S. Pat. Nos. 5,947,240 and 5,803,213 issued to Davis et al., disclose a system of passive dampers in a closed geometric shape for use in load vibration isolation.

A fairly recent active material development is magneto-rheological ("MR") fluid. MR fluids are comprised of micron sized, magnetically-polarized particles suspended in a carrier fluid. When activated by a magnetic field, the particles align along magnetic field lines and change the material's flow characteristics, such as its viscosity and bulk modulus. By varying the magnetic field flux acting on the MR fluid, the viscous damping may be modulated. U.S. Pat. No. 5,683,615 issued to Munoz describes the behavior and different chemical compositions of MR fluids.

Most prior vibration isolation devices using MR fluids have employed an active control system to regulate the magnetic field actuating the MR fluid. For example, U.S. Pat. Nos. 6,082,719; 6,196,529; and 6,196,528 issued to Shtarkman et al., disclose a spacecraft antenna vibration control damper. The vibration of the spacecraft antenna during maneuvers is sensed by an external sensor, which in turn activates the magnetic field on the MR fluid through a controller and a power supply.

The few inventions that have utilized a partially passive system for MR fluid damping are mostly for motor vehicle applications and have some aspect of active isolation. For example, U.S. Pat. No. 5,632,361 issued to Wulff et al., involves a passive MR damper that includes a constant magnetic field created by a permanent magnet in a piston, while also having a variable magnetic field provided by an electric coil. The constant magnetic field provides a "pre-stress" on the MR fluid. It is not completely passive in that it requires active control for the main isolation with the electric coil. The passive permanent magnet is typically for backup and "pre-stress."

There is a need in the art for a passive system that makes beneficial use of the advantages inherent to magneto-rheological fluid to obtain vibration isolation over a broad frequency spectrum. The present invention fulfills this need in the art.

SUMMARY OF THE INVENTION

The present invention is a passive vibration isolation system that uses a damper containing magneto-rheological ("MR") fluid in conjunction with elements that provide a varying magnetic field to provide frequency dependent isolation to hardware fixtures subject to vibration. The varying magnetic field increases the viscosity of the MR fluid, thus increasing the damping by interaction between the MR fluid and a plunger as the isolation system is vibrated.

In one embodiment, a tuned oscillator including a permanent magnet mounted on an adjustable spring oscillates within a primary wire coil at a designed frequency to induce an electric current that, in turn, creates a magnetic field in a secondary wire coil surrounding an MR fluid-filled damper. The magnetic field created by the secondary wire coil actuates the MR fluid and changes the viscosity and damping characteristics of the damper.

In another embodiment, a shielding sleeve, composed of magnetically impermeable material, is mounted on springs. A damper containing MR fluid is located within the hollow sleeve such that the sleeve regulates the magnetic field acting on the MR fluid by oscillating relative to the damper. The shielding sleeve oscillates when excited by a vibration source. The damping of the MR fluid increases at the resonance frequency of the sleeve, where sleeve displacements are large, and the damping is minimized at other frequencies when the sleeve displacement is small.

The resonance frequency of the damping elements of the invention are adjusted to match the resonance frequency of the system being isolated. This reduces vibration transmission at the resonance frequency of the system being isolated, while also providing low vibration transmission above the aforementioned resonance frequency.

Other aspects and advantages of the present invention will become apparent from the following detailed description, taken in conjunction with the accompanying drawings, and illustrating by way of example the principles of the invention.

DETAILED DESCRIPTION

Figure 1:
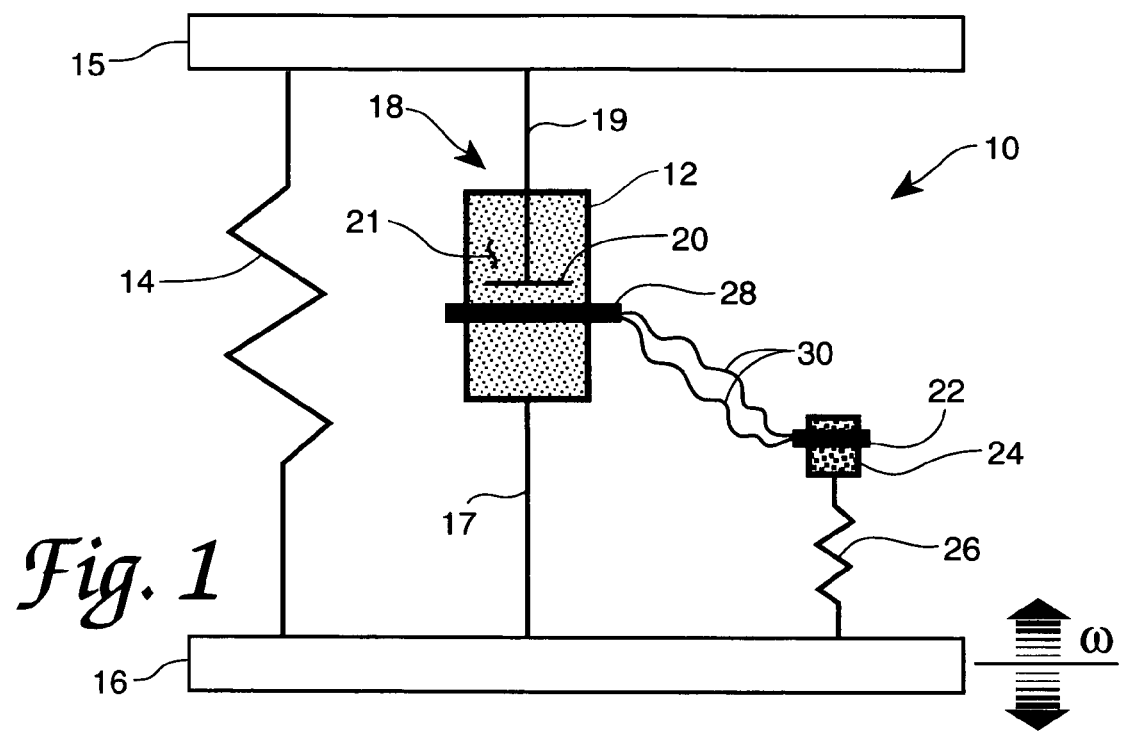
FIG. 1 schematically illustrates a vibration damping system of the present invention using primary and secondary wire coils to generate a magnetic field to regulate the viscosity of MR fluid contained in an MR fluid damper.

The present invention utilizes the properties of MR fluids to provide a passive and adjustable vibration isolation system. Referring to FIG. 1, passive damping system 10 of the present invention is schematically illustrated wherein MR fluid damper 12 is shown positioned in parallel with suspension spring 14, with both elements being located in between and connected to top fixture 15 and bottom fixture 16. When not at rest, bottom fixture 16 vibrates at a frequency of ω. Damper 12 is rigidly connected to bottom fixture 16 by rigid rod 17. Damper 12 is slideably connected to top fixture 15 by plunger 18. Plunger 18 is comprised of rigid stem 19 and head 20. Damper 12 is comprised of a cylindrical housing that contains plunger head 20 and MR fluid 21.

Primary solenoid coil 22 circumscribes permanent magnet 24. Magnet 24 is mounted on an end of adjustable spring 26, such as a cantilever or coil spring. The other end of spring 26 is attached to bottom fixture 16. The stiffness of spring 26, $k_a$, is adjustable. Magnet 24 is constrained to only oscillate along one axis, i.e., vertically, which is collinear with the primary oscillation of bottom fixture 16. Primary solenoid coil 22 is fixed relative to magnet 24 and bottom fixture 16 (its supporting structure is not shown), so that coil 22 remains stationary relative to the aforementioned elements when bottom fixture 16 vibrates at a frequency ω and magnet 24 consequently oscillates. Secondary solenoid coil 28 circumscribes damper 12, and is rigidly attached to damper 12 so that it translates with damper 12. Alternatively, coil 28 may be fixed in position relative to damper 12, so that coil 28 remains stationary with respect to damper 12 when damper 12 moves in response to the vibration of bottom fixture 16. Wires 30 electrically connect primary solenoid coil 22 to secondary solenoid coil 28.

The resonance frequency, $\omega_o$, of the system comprised of spring 26 and connected magnet 24, is determined by the square root of the ratio of the stiffness of spring 26, $k_a$, and the mass, $m_a$, of magnet 24, as shown by the following equation:

$$\omega_0 = \sqrt{\frac{k_a}{m_a}}. \tag{1}$$

It follows that the resonance frequency, $\omega_o$, can be adjusted by appropriately adjusting the variable stiffness, $k_a$, of spring 26. The significance of this feature will become apparent from the following discussion.

When subjected to vibration from bottom fixture 16, magnet 24 oscillates freely within and relative to stationary primary solenoid coil 22, resulting in a changing magnetic flux through primary solenoid coil 22. This induces a flow of electrical current, i(t), through wires 30 and consequently through secondary solenoid coil 28.

The induced current, i(t), flowing through secondary solenoid coil 28 creates a magnetic field having a strength, β, acting on MR fluid 21. The magnetic field strength, β, is dependent on the induced current, i(t), the number of coils per length in the secondary solenoid coil 28, n, and the permeability constant, $\mu_o$, in accordance with the following equation:

$$\beta = \mu_o n i(t). \tag{2}$$

The damping of damper 12 increases in proportion to the viscosity of enclosed MR fluid 21, and is also a function of the size and geometry of plunger head 20, and the inner diameter of MR fluid damper 12. The viscosity of MR fluid 21 and, concomitantly, the viscous damping of damper 12 and isolation system 10 increase in proportion to the magnetic field strength, β, acting on MR fluid 21.

The amount of current i(t) induced by primary solenoid coil 22 depends on the motion of magnet 24, which, in turn, depends on its resonance frequency and the vertical motion of bottom fixture 16. Since system 10 is entirely passive, it is relatively simple and robust, and can be used in a variety of applications where power from an external source is either limited or nonexistent.

In FIG. 1, MR fluid damper 12, primary solenoid coil 22, magnet 24, and adjustable spring 26, are shown in parallel with suspension spring 14. Alternatively, more than one spring similar to suspension spring 14 and more than one MR fluid damper 12 could be deployed between top fixture 15 and bottom fixture 16, and the foregoing elements could be deployed in combinations of parallel and series configurations, depending on the mass of top fixture 15 and the magnitude and frequency of the vibration of bottom fixture 16.

If a high frequency of vibration, ω, is expected, rod 17 could be comprised of two sections, with each section being respectively attached to the ends of a stiff spring (not shown), to attenuate the low-amplitude vibration that would otherwise be transmitted to top fixture 15.

For isolation systems of the type schematically shown in FIG. 1, isolation of top fixture 15 typically increases as the vibration frequency, ω, of bottom fixture 16 increases above $\sqrt{2}$ times the resonance frequency, $\omega_n$, of the system comprised of suspension spring 14 and top fixture 15; which is defined as the square root of the ratio of the stiffness of suspension spring 14, $k_p$, to the mass of top fixture 15, m.

$$\omega_n = \sqrt{\frac{k_p}{m}}. \tag{3}$$

The transmission ratio quantifies the reduction of the motion transmitted from bottom fixture 16 to top fixture 15, mathematically defined as:

$$\text{Transmission Ratio} = \sqrt{\frac{1 + (2\zeta r)^2}{(1 - r^2)^2 + (2\zeta r)^2}} \tag{4}$$

where: ζ is the damping ratio of MR fluid damper 12; and
r is the normalized frequency given by the equation $$r = \frac{\omega}{\omega_n}. \tag{5}$$

Figure 2:
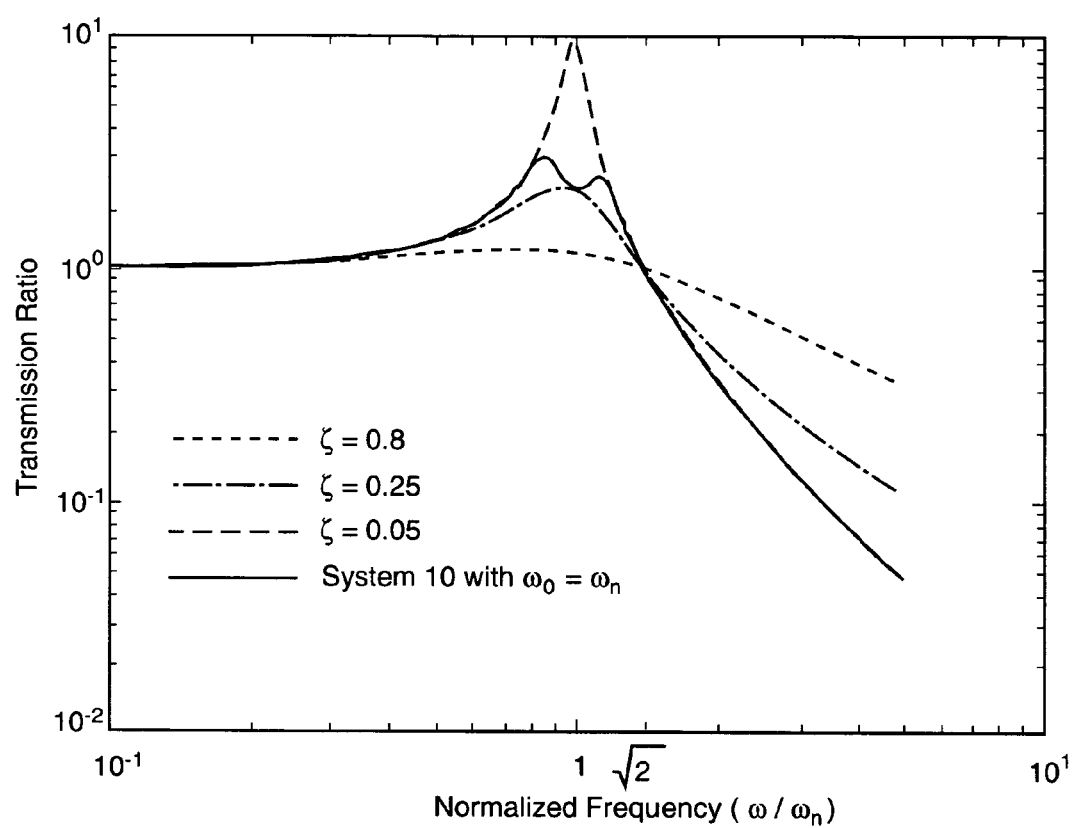
FIG. 2 is a graph illustrating the transmission ratios of the single degree of freedom isolation system shown in FIG. 1, for dampers having different fixed damping ratios, $\zeta$, and an MR fluid damper of the present invention.
Figure 3:
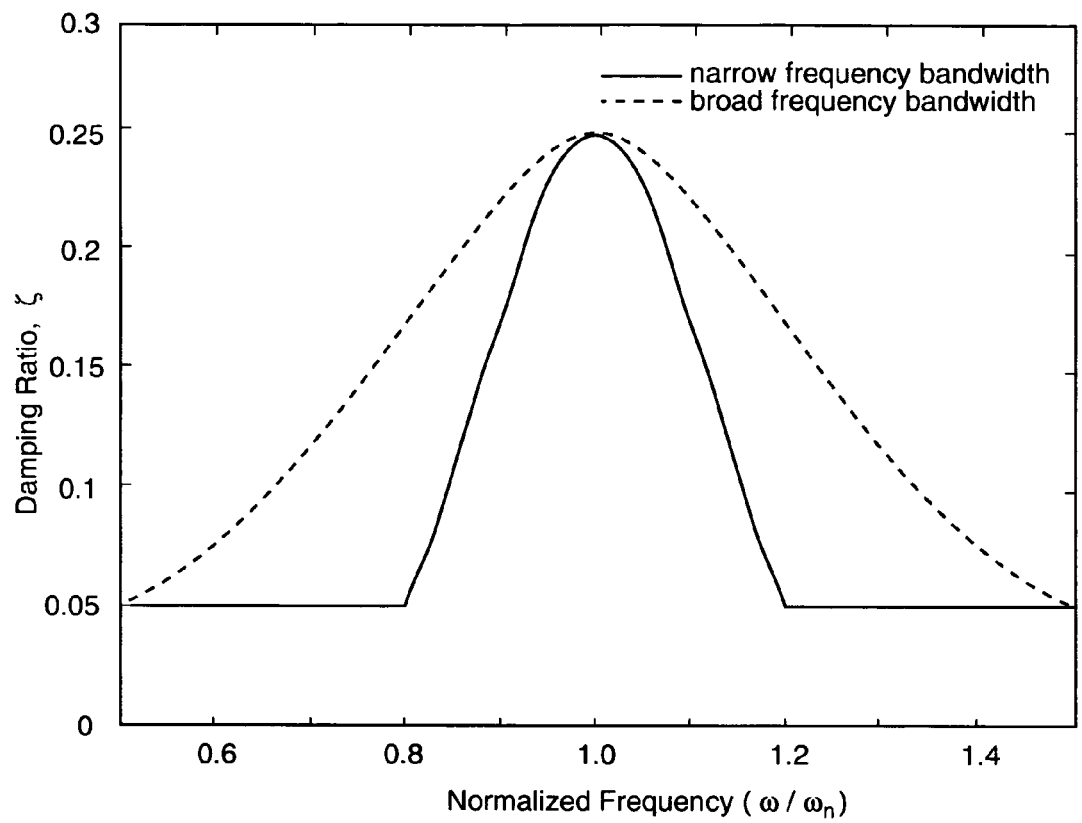
FIG. 3 is a graph of the damping ratio, $\zeta$, plotted against the normalized frequency of the MR fluid damper, for two frequency bandwidths.

FIG. 2 is a graph of the transmission ratio of system 10 plotted as a function of normalized frequency of bottom fixture 16, $\omega/\omega_n$, for $\omega_o = \omega_n$, assuming that MR fluid damper 12 has the variable damping ratio, ζ, shown by the solid line (narrow frequency bandwidth) in FIG. 3; and for MR fluid damper 12 having the fixed damping ratios of ζ=0.8, 0.25, and 0.05. For $\omega > \sqrt{2}\omega_n$, ($\omega/\omega_n > \sqrt{2}$), the transmission ratio is primarily determined by the damping ratio, ζ, of MR fluid damper 12, which is proportional its viscous damping. More particularly, the transmission ratio of isolation system 10 decreases with decreasing damping of MR fluid damper 12 for vibration frequencies, ω, above $\sqrt{2}\omega_n$. At $\omega = \omega_n$, however, the transmission ratio is greater than one and can become very large if the damping is small, e.g, $\zeta=0.05$, which is obviously undesirable. For $\omega$ approaching $\omega_n$ (with $\omega_n=\omega_o$), the damping ratio of MR fluid damper 12 increases from 0.05 to 0.25. The result of this transition, as shown in FIG. 2, is reduced transmission for $\omega$ below $\sqrt{2}\omega_n$ ($\omega/\omega_n<\sqrt{2}$) in comparison to $\zeta=0.05$, as well as reduced transmission for $\omega$ above $\sqrt{2}\omega_n$ ($\omega/\omega_n>\sqrt{2}$) in comparison to $\zeta=0.25$.

FIG. 2 demonstrates that if the resonance frequency, $\omega_o$, of the system comprised of magnet 24 and spring 26 is set (by appropriately adjusting the stiffness of adjustable spring 26) proximate to the resonance, $\omega_n$, of the system comprised of suspension spring 14 and fixture 15 (as defined by equation 3), then MR fluid damper 12 will exhibit high damping for $\omega$ proximate to $\omega_n$, and lower damping for $\omega$ above $\sqrt{2}\omega_n$. System 10 thus provides for low vibration transmission over the entire frequency bandwidth of the vibration of bottom fixture 16.

If the damping provided by MR fluid damper 12 for $\omega$ near $\omega_o$, (for $\omega_o=\omega_n$) is larger than the 0.25 maximum shown in FIG. 3, then the transmission ratio at resonance ($\omega=\omega_n$) shown in FIG. 2 would further decrease. Moreover, referring to the damping ratio profile for MR fluid damper 12 shown in FIG. 3, if the relatively narrow frequency bandwidth shown by the solid line is replaced with the broad frequency bandwidth denoted by the dashed line, the lobes on either side of $\omega=\omega_n$ would be reduced in magnitude. The system responses characterized by FIGS. 2 and 3 illustrate examples of elements that could be used in conjunction with the present invention and are presented to facilitate understanding; they are not intended to limit or restrict the scope invention.

Figure 4:
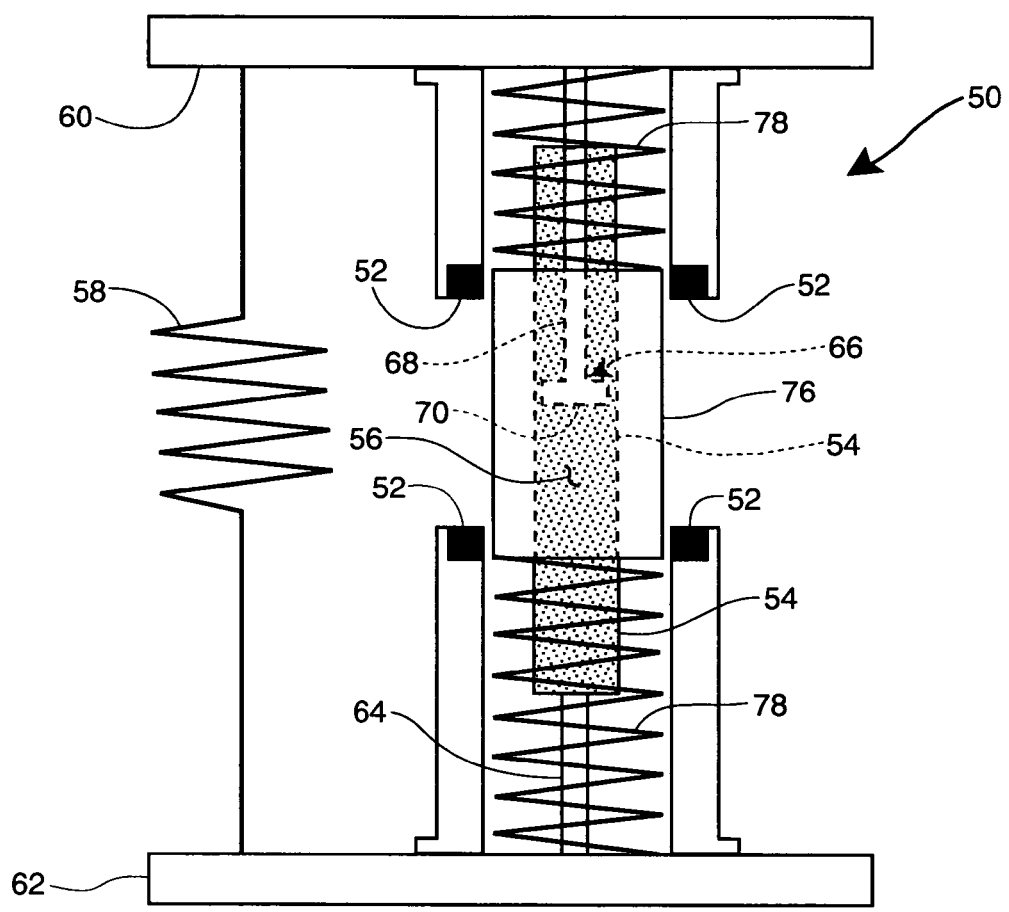
FIG. 4 is a schematic drawing of an embodiment of the present invention wherein a magnetically-impermeable shielding sleeve partially enclosing an MR fluid damper is oscillated by a vibration source to vary the magnetic field affecting the MR fluid contained in the damper, and thereby affect the viscosity of the MR fluid.

FIG. 4 is a schematic drawing of passive damping system 50, another embodiment of the present invention. As shown therein, fixed permanent magnets 52 create a magnetic field across MR fluid damper 54, which contains MR fluid 56. MR fluid damper 54 is positioned in parallel with suspension spring 58, with both elements being located in between and connected to top fixture 60 and bottom fixture 62.

Damper 54 is rigidly connected to bottom fixture 62 by rigid rod 64, and slideably connected to top fixture 60 by plunger 66. Plunger 66 is comprised of stem 68 and head 70. Annular permanent magnets 52 circumscribe MR fluid damper 54. Tubular magnetic shielding sleeve 76 is open on both ends, is comprised of magnetically impermeable material, and shields the area of MR damper 54 near plunger head 70 from the magnetic field of magnets 52 when system 50 is at rest, i.e., when top fixture 60 and bottom fixture 62 are at rest. The interposition of shielding sleeve 76 reduces the strength of the magnetic field acting on MR fluid 56 around the plunger head 70.

Shielding sleeve 76 is suspended between top fixture 60 and bottom fixture 62 by springs 78, which are attached, respectively, to top fixture 60 and bottom fixture 62. Springs 78 have a total spring rate (stiffness) of $k_s$. The resonance frequency of shielding sleeve 76, $\omega_1$, is determined by the square root of the ratio of the total spring stiffness, $k_s$, to the mass of shielding sleeve 76, $m_s$, as mathematically stated by the following equation:

$$\omega_1 = \sqrt{\frac{k_s}{m_s}}. \tag{6}$$

When the top fixture 60, or bottom fixture 62, vertically vibrates upon being excited by an external source (not shown), shielding sleeve 76 oscillates on springs 78. Suspension spring 58 has a spring stiffness $k_p$. If the non-vibrating fixture has a mass $m_d$, then the system comprised of suspension spring 58 and the non-vibrating fixture will have a fundamental resonance of $\omega_2$ mathematically expressed as $$\omega_2 = \sqrt{\frac{k_p}{m_p}}. \tag{7}$$

By setting $\omega_1$ proximate to $\omega_2$, shielding sleeve 76 will exhibit large displacements at resonance, $\omega_1$, and allow MR fluid 56 around plunger head 70 to be exposed to a stronger magnetic field than when system 50 is at rest. The varying magnetic field will increase the viscosity of MR fluid 56, thus increasing the damping from interaction between MR fluid 56 and plunger head 70 as the non-vibrating fixture vibrates at or near its resonance, $\omega_2$. Therefore, system 50 should provide the same isolation advantages as discussed in conjunction with system 10 and graphically illustrated in FIG. 2. System 50, however, differs from system 10 in that it uses permanent magnets 52 and oscillating shielding sleeve 76, rather than an induced electrical current to produce the varying magnetic field causing MR fluid 56 to react and become more viscous near plunger head 70.

It is to be understood that the preceding is merely a detailed description of several embodiments of this invention and that numerous changes to the disclosed embodiments can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. An apparatus for isolating vibration comprising:
a damping device containing a magneto-rheological fluid, for being connected to a fixture and a vibration source;
the magneto-rheological fluid having viscosity that varies as a function of a magnetic field;
a primary solenoid coil circumscribing a permanent magnet;
a secondary solenoid coil proximate to the damping device for creating the magnetic field;
oscillating means for oscillating the permanent magnet relative to the primary solenoid coil responsive to vibration of the vibration source, whereby
electrical current is generated in the primary solenoid coil; and
electrical means for transmitting electrical current from the primary solenoid coil to the secondary solenoid coil as electrical current is generated, to affect damping.

2. A vibration isolating apparatus as defined in claim 1 further comprising a suspension spring connecting the vibration source and the fixture.

3. A vibration isolating apparatus as defined in claim 2 wherein the oscillating means includes an adjustable spring connecting the permanent magnet and the vibration source.

4. A vibration isolating apparatus as defined in claim 3 wherein:
the adjustable spring and the permanent magnet comprise a first system having a first resonant frequency;
the adjustable spring has an adjustable stiffness;
the first resonant frequency is a function of the adjustable stiffness;
the fixture and the suspension spring comprising a second system having a second resonant frequency; and the adjustable stiffness is adjusted so that the first resonance frequency approximates the second resonance frequency.

5. A vibration isolating apparatus as defined in claim 4 wherein:

the damping device includes a casing and a plunger having a head;

the casing contains the magneto-rheological fluid and the head;

the head is slideable within the casing;

the plunger is rigidly connected to the fixture; and the casing is connected to the vibration source, whereby the casing and the head translate relative to each other when the vibration source vibrates.

6. A vibration isolating apparatus as defined in claim 5 further comprising:

an assembly comprised of a connecting spring and a rigid rod, for attaching the casing to the vibration source;

the rigid rod being comprised of two sections; and the connecting spring connecting tie two rod sections.

7. A vibration isolating apparatus as defined in claim 5 wherein the casing is rigidly connected to the vibration source.

8. A vibration isolating apparatus as defined in claim 5 wherein the suspension spring and the damping device are in parallel.

9. A vibration isolating apparatus as defined in claim 5 wherein the casing is capable of translating relative to the secondary solenoid coil.

10. A vibration isolating apparatus as defined in claim 5 wherein the secondary solenoid coil is fixedly attached to the casing.

* * * * *